US009975428B2

(12) United States Patent
Kim et al.

(10) Patent No.: US 9,975,428 B2
(45) Date of Patent: *May 22, 2018

(54) CLUSTER CONTROL SYSTEM OF VEHICLE AND METHOD THEREOF

(71) Applicants: Hyundai Motor Company, Seoul (KR); Kia Motors Corporation, Seoul (KR)

(72) Inventors: Joung Chul Kim, Suwon-si (KR); Sunghyun Cho, Yongin-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 273 days.

This patent is subject to a terminal disclaimer.

(21) Appl. No.: 14/884,040

(22) Filed: Oct. 15, 2015

(65) Prior Publication Data

US 2016/0107652 A1    Apr. 21, 2016

(30) Foreign Application Priority Data

Oct. 17, 2014  (KR) ........................ 10-2014-0141164

(51) Int. Cl.
*B60K 35/00* (2006.01)
*B60K 37/02* (2006.01)

(52) U.S. Cl.
CPC .............. *B60K 35/00* (2013.01); *B60K 37/02* (2013.01); *B60K 2350/2065* (2013.01)

(58) Field of Classification Search
CPC . B60K 35/00; B60K 37/02; B60K 2350/2065
See application file for complete search history.

(56) References Cited

U.S. PATENT DOCUMENTS

| 7,675,404 | B2 | 3/2010 | Kanzaka | |
|---|---|---|---|---|
| 9,701,317 | B2 * | 7/2017 | Lee | ........................ B60W 40/12 |
| 2013/0184949 | A1 * | 7/2013 | Saito | ..................... B60W 10/11 |
| | | | | 701/58 |

FOREIGN PATENT DOCUMENTS

| JP | 2002-114056 A | 4/2002 |
|---|---|---|
| JP | 2004-325108 A | 11/2004 |
| JP | 2008-13152 A | 1/2008 |
| JP | 2009-029401 A | 2/2009 |
| JP | 5466881 B2 | 4/2014 |
| JP | 2015-024766 A | 2/2015 |

* cited by examiner

*Primary Examiner* — Edwin A Young
(74) *Attorney, Agent, or Firm* — Morgan, Lewis & Bockius LLP

(57) ABSTRACT

A cluster control system of a vehicle may include a cluster controller for controlling a cluster, an engine controller for controlling an engine and supplying an engine revolutions per minute (RPM) to the cluster controller, and a transmission controller for controlling a transmission and supplying a virtual engine RPM according to a shifting type to the cluster controller when a shifting event occurs.

7 Claims, 3 Drawing Sheets

CLUSTER CONTROL SYSTEM OF VEHICLE AND METHOD THEREOF

CROSS-REFERENCE TO RELATED APPLICATION

The present application claims priority to Korean Patent Application No. 10-2014-0141164 filed Oct. 17, 2014, the entire contents of which is incorporated herein for all purposes by this reference.

BACKGROUND OF THE INVENTION

Field of the Invention

The present invention relates to a cluster control system of a vehicle and a method thereof. More particularly, the present invention relates to a cluster control system of a vehicle and a method thereof in which a driver can sense a sporty shift-feel by displaying virtual engine RPM on a cluster when a shifting operation is performed.

Description of Related Art

Generally, a driver recognizes shifting responsiveness and a shifting time by watching an engine RPM displayed on a cluster when a shifting operation is performed.

When shifting is performed, an engine revolutions per minute (RPM) received from an engine controller controlling an engine is displayed on a cluster. At this time, the engine RPM is transmitted through car area network (CAN) communication between the engine controller and the cluster, and time delay is generated during communication between the engine controller and the cluster by a structural problem of the CAN communication. Therefore, the engine RPM is not displayed on the cluster in real-time and the engine RPM is displayed on the cluster with a delay.

As such, since the engine RPM is displayed on the cluster with a delay during shifting, a driver recognizes that shifting responsiveness is deteriorated or shifting time is excessively spent.

Particularly, since a driver expecting sporty shift performance determines shifting responsiveness and shifting time through the engine RPM displayed on the cluster, a method for improving shifting responsiveness and shifting time sensing that the driver sentimentally senses is required.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a cluster control system having advantages of improving shifting responsiveness and shifting time that a driver sentimentally senses.

According to various aspects of the present invention, a cluster control system of a vehicle may include a cluster controller for controlling a cluster, an engine controller for controlling an engine and supplying an engine revolutions per minute (RPM) to the cluster controller, and a transmission controller for controlling a transmission and supplying a virtual engine RPM according to a shifting type to the cluster controller when a shifting event occurs.

The cluster controller may display the virtual engine RPM received from the transmission controller on the cluster when the cluster controller receives an on signal of a shifting flag from the transmission controller.

The cluster controller may display the engine RPM received from the engine controller on the cluster when the cluster controller receives an off signal of a shifting flag from the transmission controller.

The virtual engine RPM may be stored in the transmission controller as map data.

The virtual engine RPM may be set in accordance with a shifting pattern or a displacement of an accelerator pedal.

According to various aspects of the present invention, a cluster control method of a vehicle may include transmitting a shifting flag signal and a virtual engine RPM from a transmission controller to a cluster controller, determining whether the shifting flag signal received from the transmission controller is an on signal, and displaying the virtual engine RPM received from the transmission controller on the cluster when the shifting flag signal is an on signal.

The cluster control method of the vehicle may further include displaying an engine RPM received from an engine controller on the cluster when the shifting flag is an off signal.

According to various embodiments of the present invention, a reaction speed of an engine RPM that a driver senses is improved through cooperative control between a transmission controller and a cluster controller.

Further, since the virtual engine RPM received from the transmission controller is displayed on the cluster, it is possible to improve shifting responsiveness and shifting time that a driver senses.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention (s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
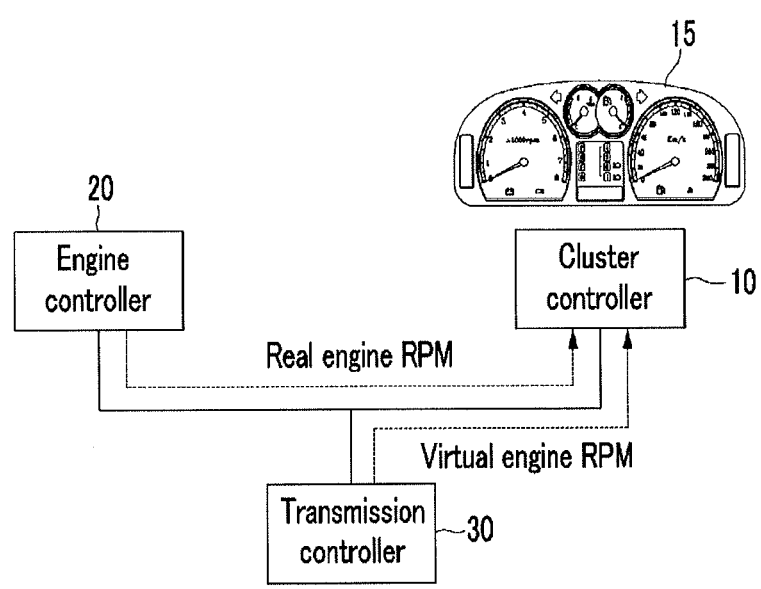
FIG. 1 is a block diagram illustrating an exemplary cluster control system of a vehicle according to the present invention.

FIG. 1 is a block diagram illustrating a cluster control system of a vehicle according to various embodiments of the present invention.

As shown in FIG. 1, a cluster control system of a vehicle according to various embodiments of the present invention includes a cluster controller 10, an engine controller 20, and a transmission controller 30.

The cluster controller 10 controls an overall operation of a cluster 15 that displays various driving information including a vehicle speed, an engine RPM, and a travel distance.

The engine controller 20 controls overall operation of an engine disposed in the vehicle, and supplies an engine RPM to the cluster controller 10.

The transmission controller 30 controls overall operation of a transmission disposed in the vehicle and supplies a virtual engine RPM according to shifting type to the cluster controller 10 when a shifting event occurs.

The cluster controller 10, the engine controller 20, and the transmission controller 30 transmit and receive various information through a communication system provided in the vehicle.

The cluster controller 10, the engine controller 20, and the transmission controller 30 may be configured as at least one processor that is operated according to a predetermined program that is configured to perform each step of the cluster control method of the vehicle according to various embodiments of the present invention.

The transmission controller 30 controls the transmission according to a required torque and a vehicle speed, and transmits a shifting flag signal to the cluster controller 10 when a shifting operation is performed. At this time, the transmission controller 30 transmits the virtual engine RPM to the cluster controller 10.

That is, the cluster controller 10 displays the virtual engine RPM received from the transmission controller 30 on the cluster 15 when the shifting flag signal received from the transmission controller 30 is an on signal.

The virtual engine RPM is stored in the transmission controller 30 as map data. The virtual engine RPM is differently set in accordance with a shifting pattern or a displacement of an accelerator pedal.

The shifting patterns may be an up shift, a down shift, a kick-down shift, a lift-foot-up shift, etc. The virtual engine RPM may be differently set in accordance with each shifting pattern. Since the virtual engine RPM is differently set in accordance with the shifting pattern, shifting responsiveness and shifting time sentimentally sensed by the driver are improved.

The virtual engine RPM is differently set in accordance with displacement of the accelerator pedal. For example, the virtual engine RPM is differently set in accordance with a state when the displacement of the accelerator pedal is large or when the displacement of the accelerator pedal is small, such that shifting responsiveness and shifting time sentimentally sensed by the driver are improved.

The cluster controller 10 displays real engine RPM received from the engine controller 20 on the cluster 15 when the shifting flag signal received from the transmission controller 30 is an off signal.

Hereinafter, an operation of the cluster control system of the vehicle according to various embodiments of the present invention will be described in detail.

Figure 2:
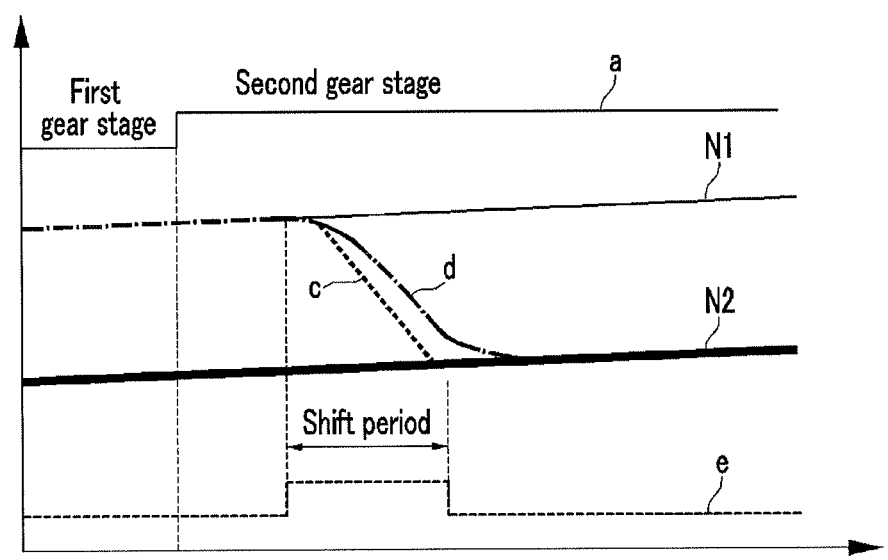
FIG. 2 is a graph illustrating an engine RPM displayed on a cluster according to a shifting operation of the present invention.

FIG. 2 is a graph illustrating an engine RPM displayed on a cluster according to a shifting operation. FIG. 2 shows that a shift stage is up-shifted from a first gear stage to a second gear stage. In the FIG. 2, the N1 line shows an engine RPM of the first gear stage and N2 line shows an engine RPM of the second gear stage.

As shown in FIG. 2, the transmission controller 30 transmits on signal (referring to 'e' line of FIG. 2) of a shifting flag to the cluster controller 10 when shifting starts from the first gear stage to the second gear stage (referring to 'a' line of FIG. 2). At this time, the transmission controller 30 transmits a virtual engine RPM (referring to 'c' line of FIG. 2) to the cluster controller 10.

The cluster controller 10 displays the virtual engine RPM received from the transmission controller 30 on the cluster 15 when the shifting flag received from the transmission controller 30 is an on signal.

When shifting is completed, the transmission controller 30 transmits an off signal of the shifting flag to the cluster controller 10, and the cluster controller 10 displays real engine RPM received from the engine controller 20 on the cluster 15.

As described above, since the virtual engine RPM received from the transmission controller 30 is displayed on the cluster 15 during a shifting period, time delay does not occur compared with when the cluster controller 10 receives the real engine RPM (referring to 'd' line of FIG. 2) from the engine controller 20 and displays the real engine RPM on the cluster 15 during the shifting period.

Therefore, the driver can sentimentally recognize that the shifting responsiveness is high and the shifting time is short.

Hereinafter, a cluster control method of a vehicle according to various embodiments of the present invention will be described in detail with reference to accompanying drawings.

Figure 3:
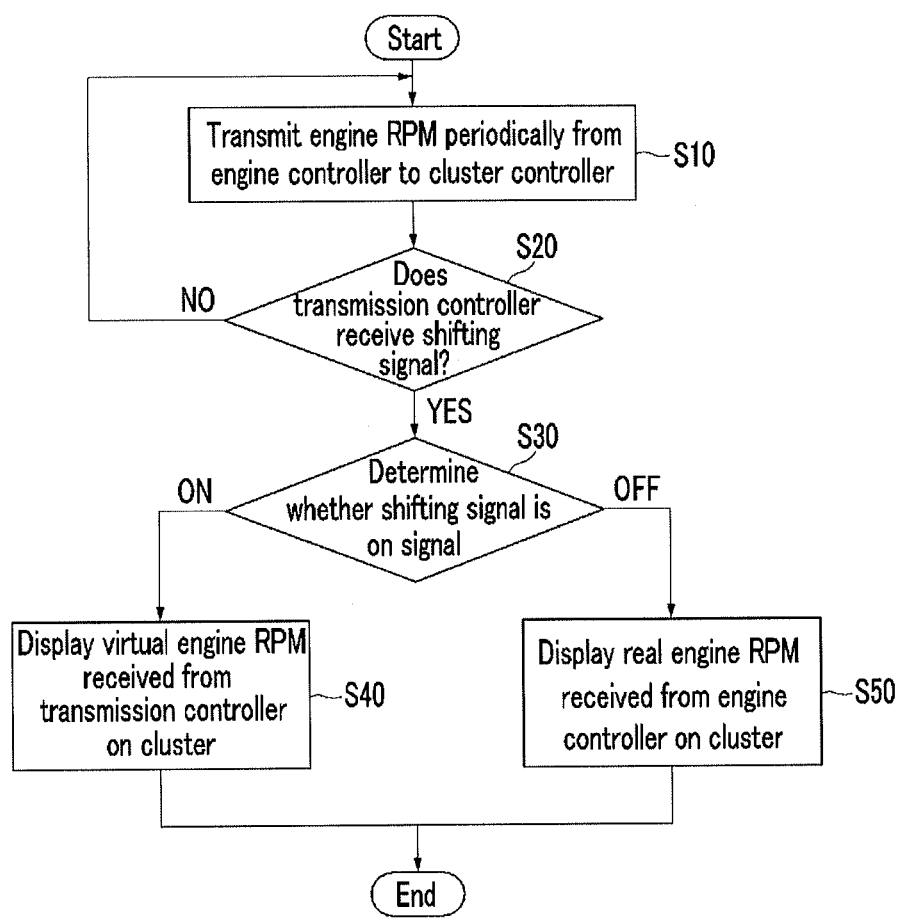
FIG. 3 is a flowchart illustrating an exemplary cluster control method of a vehicle according to the present invention.

FIG. 3 is a flowchart illustrating a cluster control method of a vehicle according to various embodiments of the present invention.

As shown in FIG. 3, the engine controller 20 transmits an engine RPM to the cluster controller 10 at certain intervals of a period at step S10.

When the transmission controller 30 receives a shifting signal from the engine controller 20 according to vehicle speed and required torque, the transmission controller 30 transmits an on signal of a shifting flag to the cluster controller 10 at step S20. The transmission controller 30 transmits the virtual engine RPM in accordance with a shifting pattern or displacement of the accelerator pedal to the cluster controller 10.

The cluster controller 10 determines whether the shifting flag signal received from the transmission controller 30 is an on signal at step S30.

When the shifting flag signal is an on signal, the cluster controller 10 displays the virtual engine RPM received from the transmission controller 30 on the cluster 15 at step S40.

When the shifting flag signal is an off signal, the cluster controller 10 displays the real engine RPM received from the engine controller 20 on the cluster 15 at step S50.

As described above, according to various embodiments of the present invention, the virtual engine RPM received from the transmission controller 30 is displayed during the shifting period, such that shifting responsiveness and shifting time that a driver sentimentally senses is improved.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A cluster control system of a vehicle, comprising:
   a cluster controller for controlling a cluster;
   an engine controller for controlling an engine and supplying information of an engine revolutions per minute (RPM) to the cluster controller; and
   a transmission controller for controlling a transmission and supplying information of a virtual engine RPM according to a shifting type to the cluster controller when a shifting event occurs,
   wherein the virtual engine RPM is preset in accordance with a shifting pattern or a displacement of an accelerator petal.

2. The cluster control system of the vehicle of claim 1, wherein the cluster controller displays the virtual engine RPM received from the transmission controller on the cluster when the cluster controller receives an on signal of a shifting flag from the transmission controller.

3. The cluster control system of the vehicle of claim 1, wherein the cluster controller displays the engine RPM received from the engine controller on the cluster when the cluster controller receives an off signal of a shifting flag from the transmission controller.

4. The cluster control system of the vehicle of claim 1, wherein the virtual engine RPM is stored in the transmission controller as map data.

5. A cluster control method of a vehicle, comprising:
   transmitting a shifting flag signal and a virtual engine revolutions per minute (RPM) from a transmission controller to a cluster controller;
   determining whether the shifting flag signal received from the transmission controller is an on signal; and
   displaying the virtual engine RPM received from the transmission controller on the cluster when the shifting flag signal is the on signal,
   wherein the virtual engine RPM is preset in accordance with a shifting pattern or a displacement of an accelerator pedal.

6. The cluster control method of the vehicle of claim 5, wherein the virtual engine RPM is stored in the transmission controller as map data.

7. The cluster control method of the vehicle of claim 5, further comprising
   displaying an engine RPM received from an engine controller on the cluster when the shifting flag is an off signal.

* * * * *